United States Patent
Irikura

(10) Patent No.: US 6,926,111 B1
(45) Date of Patent: Aug. 9, 2005

(54) VEHICLE HAVING FRONT AND REAR STEERABLE DRIVEN WHEELS

(76) Inventor: Koji Irikura, 2-18-1, Inadera, Amagasaki-shi, Hyogo (JP)

( * ) Notice: Subject to any disclaimer, the term of this patent is extended or adjusted under 35 U.S.C. 154(b) by 0 days.

(21) Appl. No.: 10/444,985

(22) Filed: May 27, 2003

Related U.S. Application Data

(60) Provisional application No. 60/469,001, filed on May 9, 2003.

(51) Int. Cl.$^7$ ............................................. B60K 23/08
(52) U.S. Cl. ...................................... 180/234; 180/242
(58) Field of Search ........................... 180/234, 242, 180/233

(56) References Cited

U.S. PATENT DOCUMENTS

| | | | |
|---|---|---|---|
| 3,351,147 A | * | 11/1967 | Williamson .................. 180/6.3 |
| 4,715,466 A | * | 12/1987 | Ishii et al. ................... 180/233 |
| 6,336,513 B1 | | 1/2002 | Hasegawa et al. |
| 2001/0050188 A1 | * | 12/2001 | Ima ............................. 180/22 |
| 2003/0205427 A1 | * | 11/2003 | Ima ............................. 180/370 |
| 2004/0079563 A1 | * | 4/2004 | Ohashi ....................... 180/53.1 |

FOREIGN PATENT DOCUMENTS

| | | | | |
|---|---|---|---|---|
| JP | 401218977 A | * | 9/1989 | ............ B62D 7/14 |
| WO | WO 9746478 A1 | * | 12/1997 | ........... B66F 9/065 |

* cited by examiner

Primary Examiner—Kevin Hurley
(74) Attorney, Agent, or Firm—Sterne, Kessler, Goldstein & Fox P.L.L.C.

(57) ABSTRACT

A vehicle, comprising a prime mover, a steering operation device, a first transaxle apparatus disposed at one of front and rear portions of the vehicle, and a second transaxle apparatus disposed at the other of front and rear portions of the vehicle. The first transaxle apparatus supports a pair of right and left first axles, and a pair of right and left first wheels are attached to outermost ends of the respective first axles so as to be turned laterally according to manipulation of the steering operation device. A first differential gear unit of the first transaxle apparatus differentially connects the first axles to each other. The first transaxle apparatus supports a power take-off shaft. A transmission of the first transaxle apparatus is driven by the prime mover. Output force of the transmission is shared between the first differential gear unit and the power take-off shaft. The second transaxle apparatus supports a pair of right and left second axles, and a pair of right and left second wheels are attached to outermost ends of the respective second axles so as to be turned laterally according to manipulation of the steering operation device. A second differential gear unit of the second transaxle apparatus differentially connects the second axles to each other. The second transaxle apparatus supports an input shaft of the second differential gear unit. A power-transmitting member is interposed between the power take-off shaft and the input shaft so as to transmit the output force of the transmission to the second wheels.

7 Claims, 13 Drawing Sheets

VEHICLE HAVING FRONT AND REAR STEERABLE DRIVEN WHEELS

This application claims the benefit of U.S. Provisional Application Ser. No. 60/469,001 filed May 9, 2003.

BACKGROUND OF THE INVENTION

1. Field of the Invention

The present invention relates to a vehicle having front and rear pairs of steerable driven wheels so constructed as to realize excellently small and stable turning.

2. Related Art

A vehicle shown in FIG. 5 of U.S. Pat. No. 6,336,513 B1 is provided at front and rear portions thereof with respective pairs of right and left steerable wheels. One pair of (rear) right and left steerable wheels are drive wheels supported by a transaxle housing so as to be driven by a prime mover provided on the vehicle through a transmission such as a hydrostatic stepless transmission (hereinafter, "HST") disposed in the transaxle housing while they are turned laterally by steering operation. Furthermore, when the vehicle turns right or left, front and rear pairs of steerable wheels laterally turn symmetrically to each other with respect to a lateral line dividing the vehicle into front and rear portions. In this way, both the front and rear pairs of right and left steerable wheels are controlled in their lateral turning by steering operation, thereby enabling the vehicle to turn on an excellent small circle.

For traveling on rough or soft ground, a desirable feature for a vehicle having front and rear pairs of right and left wheels is to be able to transmit power to both the front and rear pairs of wheels. However, either the front or rear pair of steerable wheels of the above conventional vehicle, i.e., the wheels other than the pair supported by the transaxle housing are free from power of the prime mover. More specifically, there is no conventional vehicle provided at both front and rear portions thereof with respective pairs of right and left steerable wheels driven by the prime mover in association with steering operation.

SUMMARY OF THE INVENTION

An object of the present invention is to provide a vehicle having front and rear steerable driven wheels.

To achieve the foregoing and other objects, a vehicle as a first aspect of the present invention comprises a prime mover, a steering operation device, a first transaxle apparatus disposed at one of front and rear portions of the vehicle, and a second transaxle apparatus disposed at the other of front and rear portions of the vehicle. The first transaxle apparatus supports a pair of right and left first axles, and a pair of right and left first wheels are attached to outermost ends of the respective first axles so as to be turned laterally according to manipulation of the steering operation device. A first differential gear unit of the first transaxle apparatus differentially connects the first axles to each other. The first transaxle apparatus supports a power take-off shaft. A transmission of the first transaxle apparatus is driven by the prime mover. Output force of the transmission is shared between the first differential gear unit and the power take-off shaft. The second transaxle apparatus supports a pair of right and left second axles, and a pair of right and left second wheels are attached to outermost ends of the respective second axles so as to be turned laterally according to manipulation of the steering operation device. A second differential gear unit of the second transaxle apparatus differentially connects the second axles to each other. The second transaxle apparatus supports an input shaft of the second differential gear unit. A power-transmitting member is interposed between the power take-off shaft and the input shaft so as to transmit the output force of the transmission to the second wheels.

Alternatively, a vehicle as a second aspect of the present invention also comprises a prime mover, a steering operation device, a first transaxle apparatus disposed at one of front and rear portions of the vehicle, and a second transaxle apparatus disposed at the other of front and rear portions of the vehicle. The first transaxle apparatus supports a pair of right and left first axles, and a pair of right and left first wheels are attached to outermost ends of the respective first axles so as to be turned laterally according to manipulation of the steering operation device. A differential gear unit of the first transaxle apparatus differentially connects the first axles to each other. The first transaxle apparatus supports a pair of power take-off shafts. The pair of power take-off shafts are drivingly connected to the respective first axles. A transmission of the first transaxle apparatus is driven by the prime mover. Output force of the transmission is transmitted to the differential gear unit. The second transaxle apparatus supports a pair of right and left second axles, and a pair of right and left second wheels are attached to outermost ends of the respective second axles so as to be turned laterally according to manipulation of the steering operation device. The second transaxle apparatus supports a pair of input shafts drivingly connected to the respective second axles. A pair of power-transmitting members are interposed between the pair of power take-off shafts and the pair of input shafts, respectively, so as to transmit the output force of the transmission to the second wheels.

Whether the vehicle serves as the first or second aspect of the present invention, the first transaxle apparatus may include a housing incorporating the transmission. The transmission may be a hydrostatic transmission.

For a steering system of the vehicle, whether it serves as the first or second aspect of the present invention, the steering operation device is provided with a neutral position for straight traveling of the vehicle and can be manipulated from the neutral position to laterally opposite sides with respect to the vehicle. When the steering operation device is manipulated from the neutral position to one of the laterally opposite sides, either the pair of first wheels or the pair of second wheels are turned laterally to the same side with the lateral side of the manipulated steering operation device, and the other pair of first wheels or second wheels are turned laterally to the opposite side to the lateral side of the manipulated steering operation device.

Furthermore, when the steering operation device is manipulated from the neutral position, extensions of the axes of all the first and second wheels are gathered together at a point. The point approaches the lateral middle of the vehicle as the steering operation device is manipulated from the neutral position.

The lateral turning angle of one of the right and left first wheels disposed at the inside of the vehicle turning right or left may be larger than the lateral turning angle of the other left or right first wheel disposed at the outside of the turning vehicle, and the lateral turning angle of one of the right and left second wheels disposed at the inside of the vehicle turning right or left may be larger than the lateral turning angle of the other left or right second wheel disposed at the outside of the turning vehicle.

These, other and further objects, features and advantages of the present invention will appear more fully from the following description.

BRIEF DESCRIPTION OF THE DRAWINGS/FIGURES

DETAILED DESCRIPTION OF THE INVENTION

Figure 1:
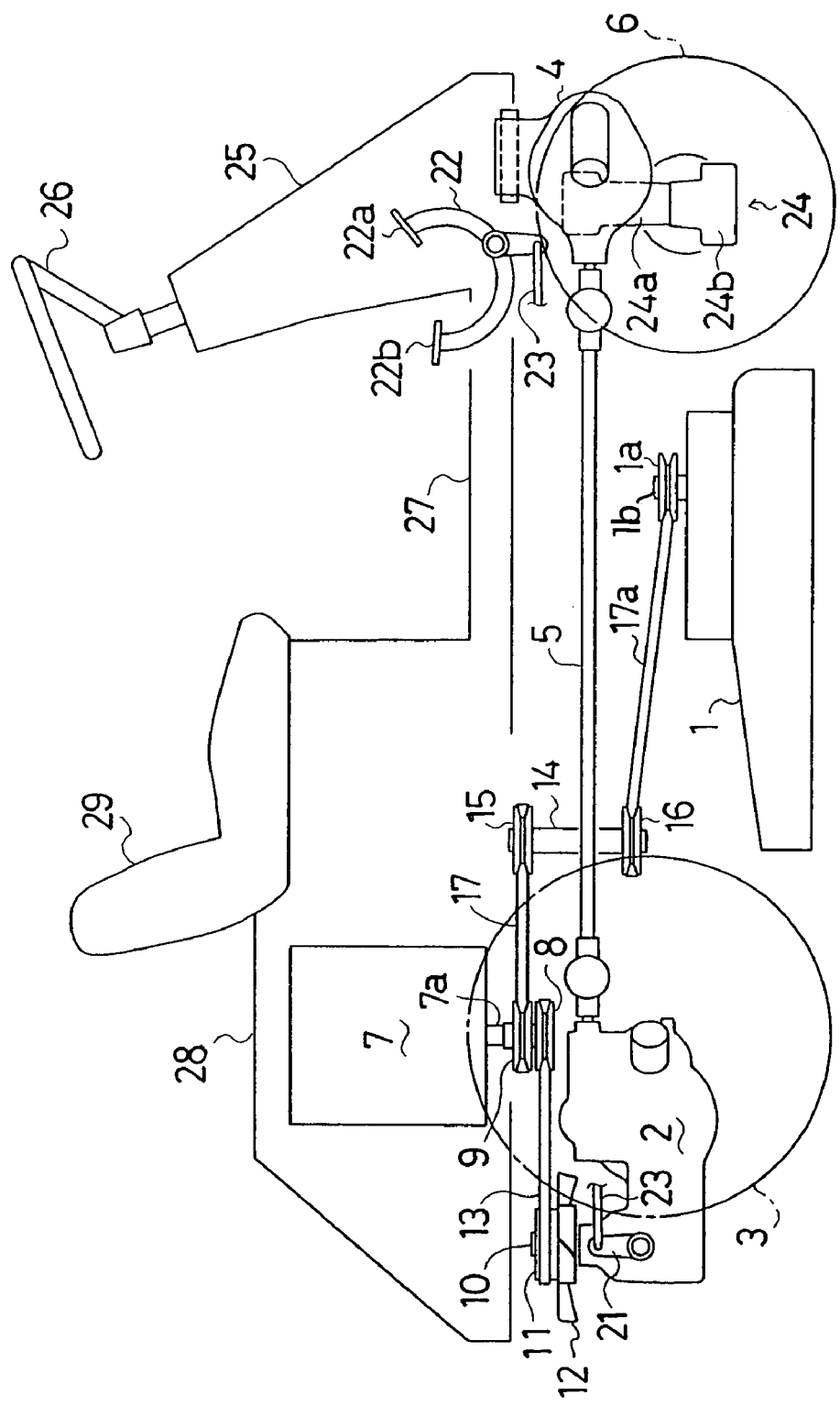
FIG. 1 is a side view of a vehicle according to the present invention.

Referring to FIG. 1, a vehicle according to the present invention is provided below a longitudinally middle portion thereof with a mower unit 1. A rear transaxle housing 2 is disposed behind mower unit 1 so as to rotatably support right and left rear wheels 3. A front transaxle housing 4 is disposed in front of mower unit 1 so as to rotatably support right and left front wheels 6. An engine 7 is disposed above rear transaxle housing 2. An output shaft 7a is extended vertically downward from engine 7 and fixedly provided thereon with output pulleys 8 and 9. An input shaft 10 projects upward from rear transaxle housing 2 and is fixedly provided thereon with an input pulley 11 and a cooling fan 12. A belt 13 is interposed between pulleys 8 and 11 so as to transmit power from engine 7 into rear transaxle housing 2. A vertical transmission shaft 14 is disposed between rear transaxle housing 2 and mower unit 1. A pulley 15 is fixed on the top of shaft 14, and a pulley 16 is fixed on the bottom of shaft 14. An input shaft 1b projects upward from mower unit 1 and is fixedly provided thereon with an input pulley 1a. A belt 17 is interposed between pulleys 9 and 15, and a belt 17a between pulleys 16 and 1a. Thus, the torque of output shaft 7a of engine 7 is shared between mower 1 and rear transaxle housing 2.

For driving rear wheels 3, rear transaxle housing 2 incorporates an HST 18 including a hydraulic pump 19 and a hydraulic motor 20 fluidly connected to each other as discussed later. Above-mentioned input shaft 10 serves as an upward extension of a pump shaft of hydraulic pump 19. Referring to FIG. 1, a control lever 21 engaging with a movable swash plate of hydraulic pump 19 is supported on an outside of transaxle housing 2 so as to be rotatable in the longitudinal direction of the vehicle. On the front portion of the vehicle is disposed a speed change pedal device 22, which preferably looks like a seesaw and includes a front pedal 22a and a rear pedal 22b. Pedal device 22 is connected to control lever 21 through a link 23. Control lever 21 is rotated to one side from its neutral position by depression of front pedal 22a so as to drive rear wheels 3 forward, and to the other side from the neutral position by depression of rear pedal 22b so as to drive rear wheels 3 backward. The driving speed of rear wheels 3 varies according to the rotational degree of control lever 21 corresponding to the degree of depression of pedal 22a or 22b.

For driving front wheels 6, at least one propeller shaft 5 is interposed between rear and front transaxle housings 2 and 4 so as to transmit the output power of hydraulic motor 19 in rear transaxle housing 2 to a differential gear unit in front transaxle housing 4. Propeller shaft 5 is disposed so as not to interfere with mower unit 1, the transmission system from engine 7 to mower unit 1, and link 23 interposed pedal device 22 and control lever 21, etc. Right and left final deceleration gear casings 24 are disposed on right and left ends of front transaxle housing 4 so as to transmit output force of the differential gear unit in front transaxle housing 4 to respective front wheels 6.

A front column 25 is provided upright on the front end portion of the vehicle. A steering wheel 26 is disposed above front column 25 so as to turn front and rear wheels 6 and 3 laterally. Speed change pedal device 22 is disposed at the foot of front column 25. A footboard 27 is spread backward from the foot of front column 25 above propeller shaft 5. Behind footboard 25 is mounted an engine cover 28 enclosing engine 7. A driver's seat 29 is mounted on engine cover 28.

Figure 2:
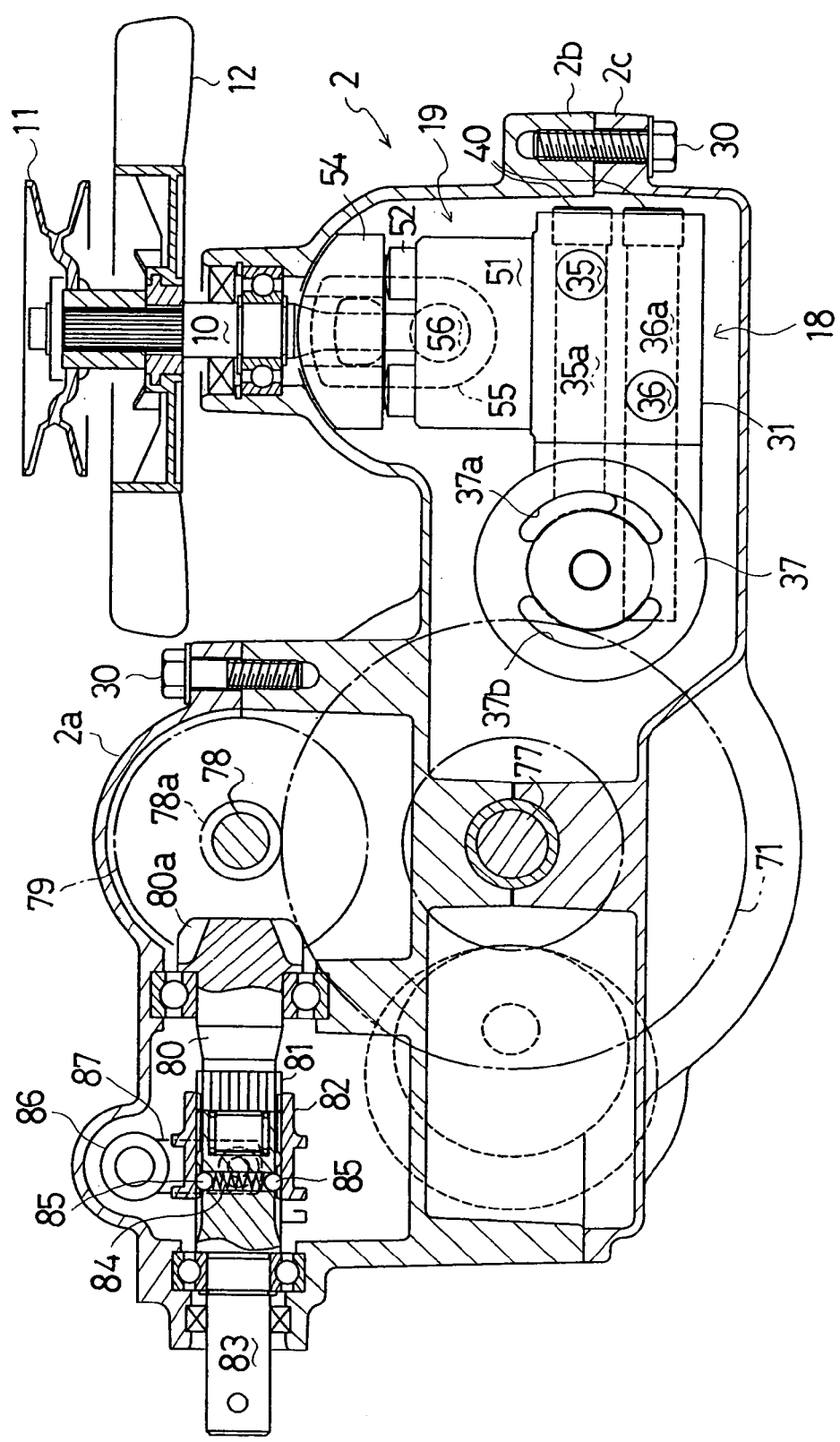
FIG. 2 is a side sectional view of an interior of a rear transaxle housing according to the present invention.
Figure 3:
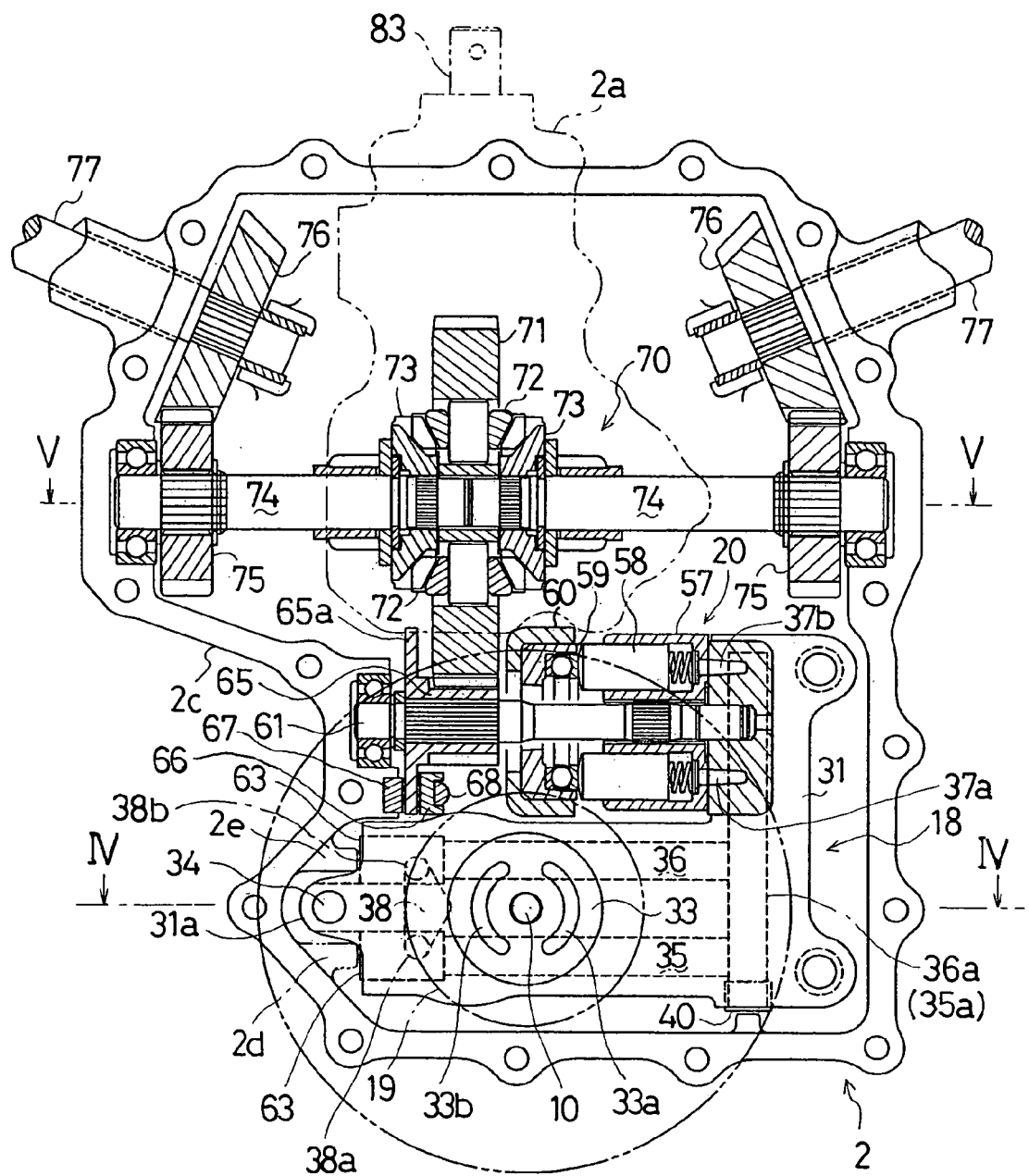
FIG. 3 is a plan view of the interior of the rear transaxle housing shown in FIG. 2 from which the upper and middle divisional members are removed.

Referring to FIGS. 2 to 8, an embodiment of the power transmission system in rear transaxle housing 2 will be described. Generally, the rear half at the inner space enclosed by rear transaxle housing 2 serves as a chamber for HST 18, and the front half of the inner space thereof is provided for arrangement of gears and shafts for transmitting the output force of HST 18 to rear and front wheels 3 and 6, as shown in FIGS. 2 and 3.

As shown in FIG. 2, rear transaxle housing 2 is formed by vertically joining an upper divisional member 2a, middle divisional member 2b and lower divisional member 2c to one another with bolts 30 through respective horizontal joint surfaces. The rear chamber of housing 2 for HST 18 is constituted by mutually joined middle and lower divisional members 2b and 2c. The remaining front chamber of housing 2 is constituted by upper, middle and lower divisional members 2a, 2b and 2c.

Figure 4:
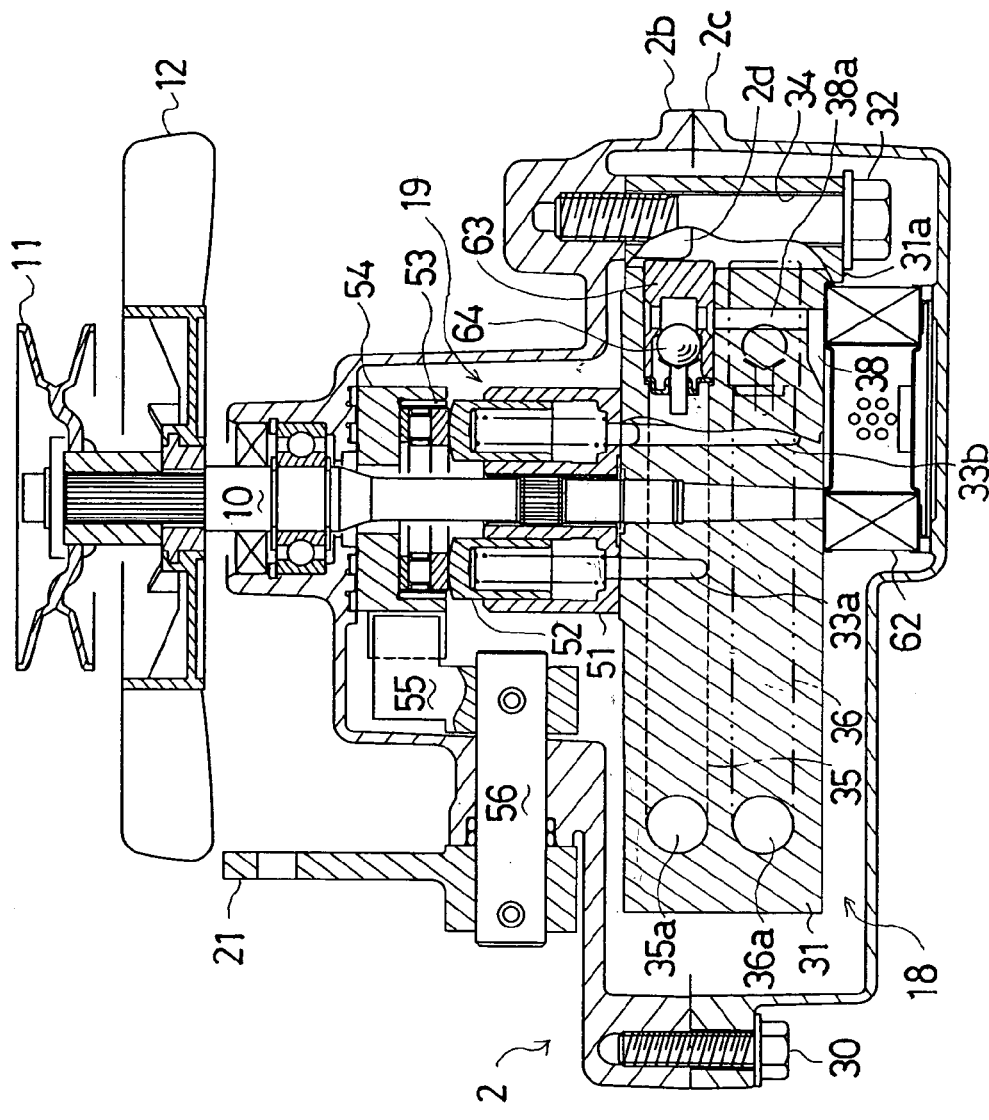
FIG. 4 is a cross sectional view taken along IV—IV line of FIG. 3.

Hydraulic pump 19 and hydraulic motor 20 (shown in FIG. 3) are mounted on a center section 31 and fluidly connected to each other through a closed oil circuit within center section 31, so as to constitute HST 18. Center section 31 consists of an intermediate portion, a laterally elongated rear portion extended either rightward or leftward (in this embodiment, leftward) from the intermediate portion and a longitudinally elongated front portion extended forward from the intermediate portion, so that center section 31 is generally L-shaped when viewed in plan as shown in FIG. 3. The laterally elongated rear portion of center section 31 is provided on the top thereof with a horizontal surface serving as a pump mounting surface 33, onto which hydraulic pump 19 is mounted. As shown in FIGS. 3 and 4, a fixture portion 31a projects laterally (leftwardly) outward from a vertical (left) end surface of the laterally elongated rear portion of center section 31. A vertical bolthole 34 penetrates fixture portion 31a. A bolt 32 is screwed upward into an inner surface of middle divisional member 2b through bolthole 34 so as to fix center section 31 to housing 2.

Parallel laterally horizontal bores 35 and 36 are formed in the laterally elongated rear portion of center section 31. Bore 35 is disposed above and behind bore 36, shown best in FIG. 2. A pair of kidney ports 33a and 33b are open at pump mounting surface 33 so as to fluidly communicate with hydraulic pump 19 mounted thereon. As shown in FIG. 4, a part of each of kidney ports 33a and 33b is extended downward in center section 31 and connected to each of horizontal bores 35 and 36.

As shown in FIG. 4, hydraulic pump 19 includes a pump cylinder block 51 slidably rotatably fitted on pump mounting surface 33. Pistons 52 are disposed vertically and reciprocally fitted through respective springs into pump cylinder block 51. Heads (tops) of all pistons 52 abut against a movable swash plate 53 disposed above pump cylinder block 51. Swash plate 53 is held by a retainer 54 slidably fitted to the ceiling of middle divisional member 2b of housing 2, thereby being enabled to tilt relative to housing 2. Vertical pump shaft 10 penetrates pump cylinder block 51 axially parallel to pistons 52 surrounding pump shaft 10, while pump shaft 10 engages with cylinder block 51 so as to rotate together. The bottom end of pump shaft 10 is rotatably fitted into center section 31. Pump shaft 10 projects upward from pump cylinder block 51, freely passes through swash plate 53, and projects upward from rear transaxle housing 2 while being journalled by the ceiling of middle divisional member 2b through a bearing. As mentioned above, input pulley 11 and cooling fan 12 are fixed onto the upward projecting portion of pump shaft 10 (serving as above-mentioned input shaft 10).

A control shaft 56 is rotatably supported by a vertical wall of middle divisional member 2b of housing 2 above the laterally elongated rear portion of center section 31 at the (left) side of pump cylinder block 51. Retainer 54 is connected to control shaft 56 through an arm 55 disposed in housing 2 so that swash plate 53 is tilted by rotation of control shaft 56. Above-mentioned control lever 21 is fixed on control shaft 56 outside housing 2. Due to such a construction, either front or rear pedal 22a or 22b is depressed so as to tilt swash plate 53, thereby deciding the amount and/or direction of oil discharged from hydraulic pump 19.

A vertical (left) side surface of the longitudinally elongated front portion of center section 31 serves as a motor mounting surface 37 onto which hydraulic motor 20 is mounted laterally. A pair of kidney ports 37a and 37b are open at vertical motor mounting surface 37 and bored in center section 31 so as to be connected to respective upper and lower bores 35a and 36a. Upper and lower horizontal bores 35a and 36a aligned parallel in a vertical row are formed in center section 31 along the longitudinally elongated front portion thereof and extended rearward through the intermediate portion of center section 31 as to be open at the rear vertical surface of center section 31. Plugs 40 close the rear end openings of respective bores 35a and 36a. The (right) ends of lateral bores 35 and 36 (opposite to their left open ends plugged by later-discussed plugs 63) are connected to respective longitudinal bores 35a and 36a in the intermediate portion of center section 31. Thus, kidney ports 33a and 37a are mutually connected through bores 35 and 35a within center section 31, and kidney ports 33b and 37b through bores 36 and 36a within center section 31.

As seen in FIG. 3, hydraulic motor 20 includes a motor cylinder block 57 slidably rotatably fitted on motor mounting surface 37 so as to be disposed just in front of the laterally elongated rear portion of center section 31. Pistons 58 are laterally disposed and reciprocally fitted through respective springs into motor cylinder block 57. Heads (left ends in FIG. 3) of all pistons 58 abut against a fixed swash plate 59, which is held by a retainer 60 fixedly disposed in front of the laterally elongated rear portion of center section 31. A motor shaft 61 is disposed laterally horizontally and penetrates motor cylinder block 57 axially in parallel to pistons 58 surrounding motor shaft 61, while motor shaft 61 engages with cylinder block 57 so as to rotate together. Motor shaft 61 freely passes through swash plate 59 and retainer 60. One end of motor shaft 61 is rotatably fitted into center section 31. The other end of motor shaft 61 is disposed between middle and lower divisional members 2b and 2c so as to be rotatably supported by housing 2 through a bearing.

Therefore, hydraulic pump 19 and hydraulic motor 20 are fluidly connected to one another through a pair of oil passages formed in center section 31, i.e., a first passage constituted by bores 35 and 35a and kidney ports 33a and 37a and a second passage constituted by bores 36 and 36a and kidney ports 33b and 37b.

As seen in FIG. 4, an oil filter 62 is disposed between the bottom surface of the laterally elongated rear portion of center section 31 and the inner bottom surface of lower divisional member 2c of housing 2. A charge oil port 38 is open at the bottom surface of center section 31 so as to communicate with the space surrounded by oil filter 62. In center section 31, a pair of vertical bores 38a and 38b (not shown) are extended downward from respective horizontal bores 35 and 36 to charge oil port 38.

As seen in FIG. 3, horizontal oil bores 35 and 36 are open at the end surface of center section 31. Fixture portion 31a projects from the end surface of center section 31 between the open ends of oil bores 35 and 36, which are plugged by respective plugs 63. Inner projections 2d and 2e project inward from the inner surfaces of respective members 2b and 2c so as to retain respective plugs 63. In each plug 63 is formed an oil-charge passage for bringing each of vertical bores 38a and 38b into communicate with each of horizontal bores 35 and 36. In plug 63 is disposed a ball 64 for opening and closing the oil-charge passage so as to serve as a check valve, which allows only flow of oil from charge oil port 38 to each oil bore 35 or 36.

A motor output gear 65 is fixed around motor shaft 61 between the end of motor shaft 61 journalled by housing 2 and retainer 60. Motor output gear 65 meshes with a large input gear 71 of a differential gear unit 70. A portion of motor output gear 65 is formed into a brake disk 65a extending between brake pads 66 and 67 in housing 2. A brake camshaft 68 is disposed in housing 2 so that brake camshaft 68 may be rotated to press brake pad 66 together with brake disk 65a against brake pad 67, thereby braking motor shaft 61.

Proximal ends of right and left differential output shafts 74 are rotatably inserted into differential input gear 71 axially so as to face each other. Right and left differential output shafts 74 are laterally and horizontally extended from differential input gear 71 oppositely to each other parallel to motor shaft 61. Bevel gears serving as differential side gears 73 are fixed on respective differential output shafts 74 adjacently to right and left side surfaces of differential input gear 71. A pair of bevel gears serving as differential pinions 72 are rotatably supported in differential input gear 71 mutually symmetrically with respect to differential output shafts 74. Each differential pinion 72 meshes with both differential side gears 73. Thus, differential gear unit 70 is constituted.

Axes of differential output shafts 74 are disposed on a horizontal joint surface between middle and lower divisional members 2b and 2c of housing 2. Distal ends of differential output shafts 74 are rotatably sandwiched between members 2b and 2c through respective bearings. A spur gear 75 is fixed on each differential output shaft 74 adjacently to the journalled distal end thereof. Right and left rear axles 77 are rotatably supported by lower divisional member 2c of housing 2 and extended laterally but a little forwardly slantwise from housing 2 so as to be provided on their distal ends with respective rear wheels 3. A bevel gear 76 is fixed on each rear axle 77 in housing 2 and mesh with each gear 75. Thus, output force of motor shaft 61 is transmitted to right and left rear wheels 3 through differential gear unit 70.

As shown in FIG. 2, front-wheel driving shaft 83, serving as a power-take off shaft, projects forward from a front end of rear transaxle housing 2 so as to be connected to the above-mentioned propeller shaft 5 through a universal joint. In rear transaxle housing 2, a reduction gear train and a driving-mode switching clutch are interposed between differential input gear 71 and front-wheel driving shaft 83. Thus, input gear 71 of differential gear unit 70 is shared between rear wheels 3 and front wheels 6 in driving power.

Figure 5:
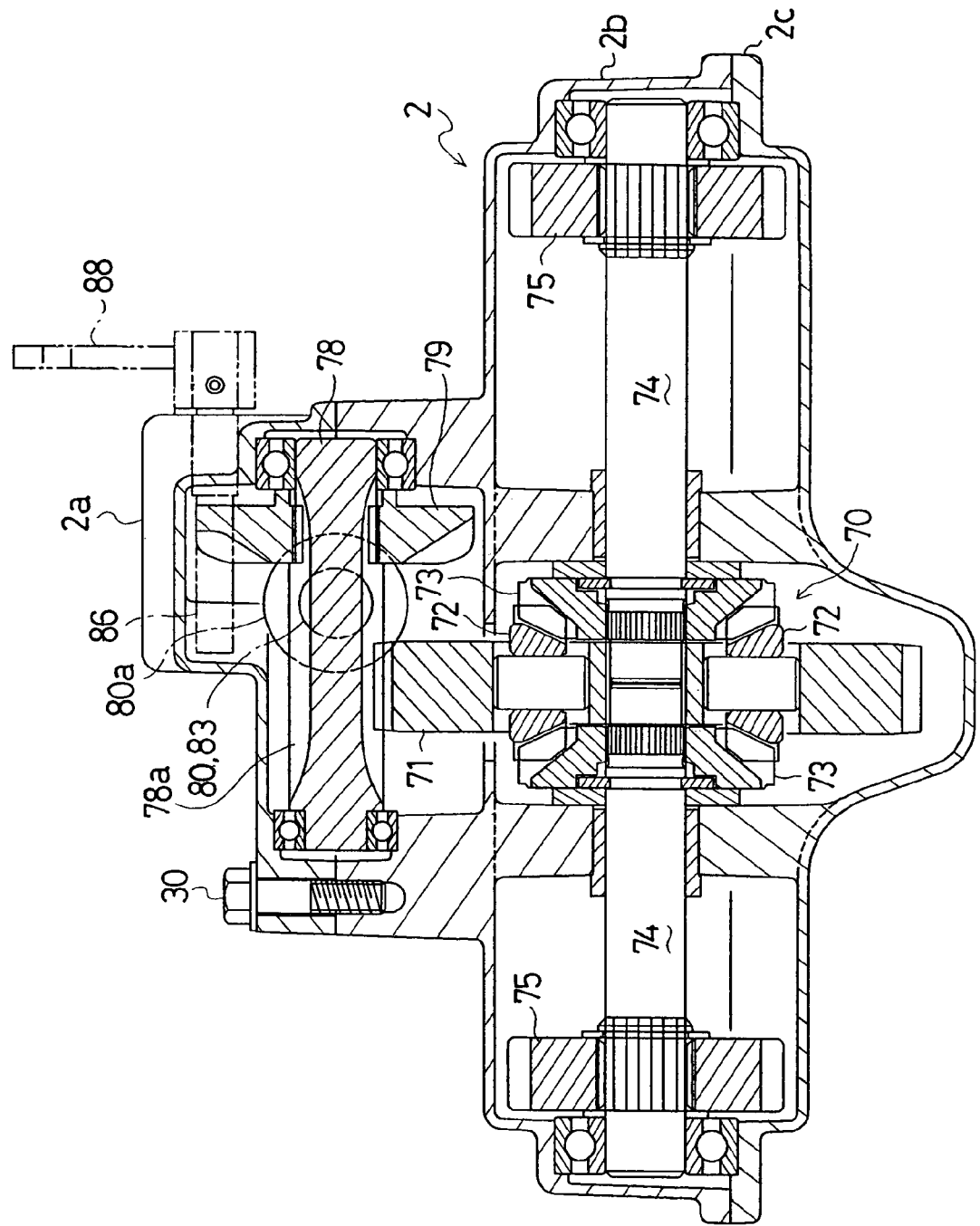
FIG. 5 is a cross sectional view taken along V—V line of FIG. 3.

For constituting the reduction gear train for driving shaft 84, as shown in FIGS. 2 and 5, a counter shaft 78 is disposed laterally horizontally above and parallel to differential output shafts 74 in parallel. Both ends of counter shaft 78 are rotatably sandwiched between upper and middle divisional members 2a and 2b of rear transaxle housing 2 through respective bearings. Namely, an axis of counter shaft 78 is substantially disposed on a horizontal joint surface between upper and middle divisional members 2a and 2b. A peripheral surface of counter shaft 78 is notched so as to serve as a counter input gear 78a meshing with differential input gear 71. On counter shaft 78 adjacent to one end thereof is fixed a bevel gear 79, which is diametrically larger than counter input gear 78a. A clutch shaft 80 and front-wheel driving shaft 83 are mutually coaxially disposed longitudinally of rear transaxle housing 2 in front of counter shaft 78 (i.e., axes of shafts 80 and 83 are substantially disposed on the horizontal joint surface between members 2a and 2b), and rotatably supported between upper and middle divisional members 2a and 2b through bearings. In rear transaxle housing 2, a rear end of clutch shaft 80 is formed into a bevel gear 80a meshing with bevel gear 79 on counter shaft 78.

Figure 6:
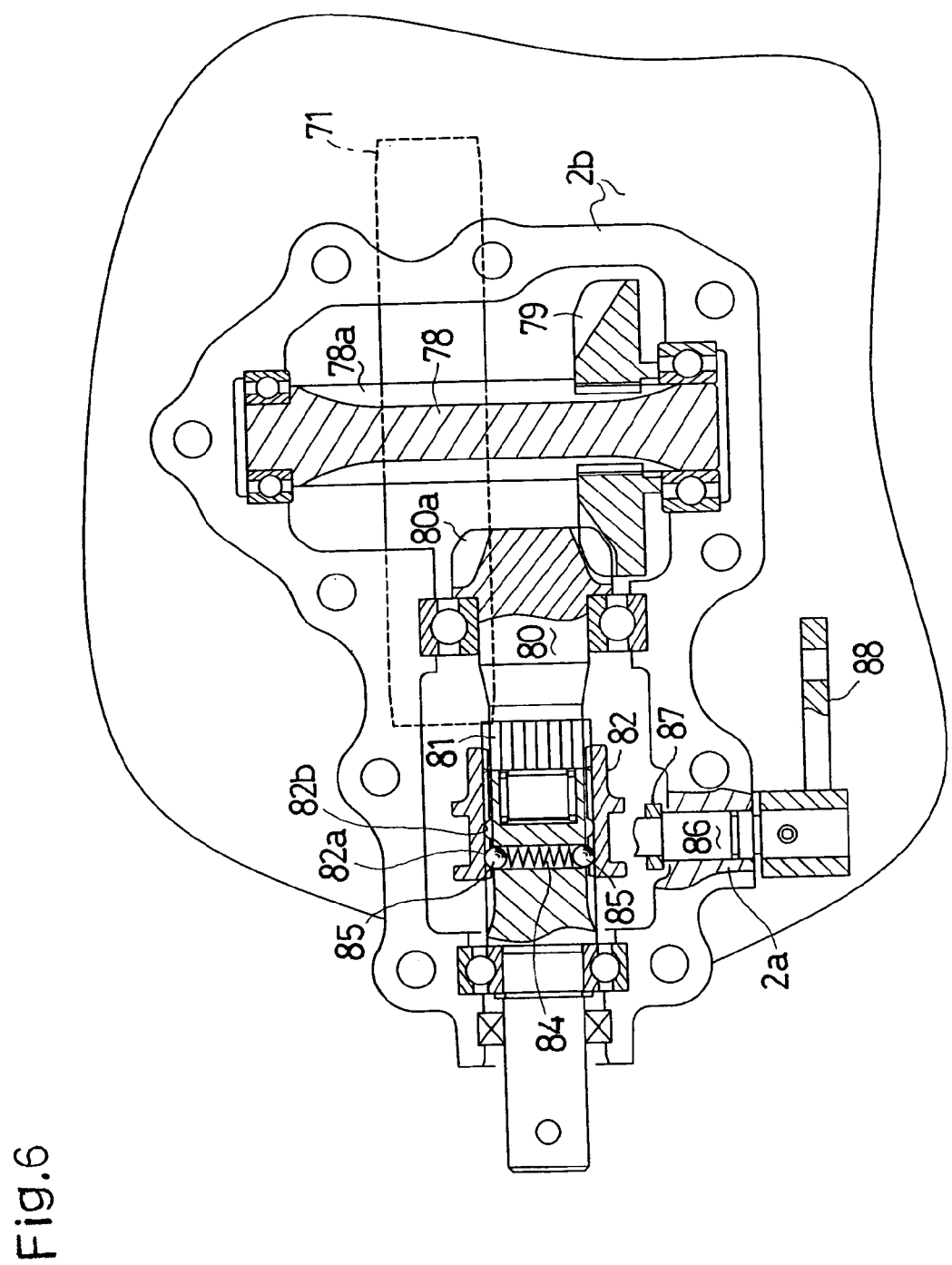
FIG. 6 is a fragmentary plan view partly in section of the interior of the rear transaxle housing shown in FIG. 2 from which an upper divisional member except a part thereof is removed, showing a front-wheel driving shaft provided with a clutch.

A clutch sleeve 82 serving as the driving-mode switching clutch is fitted axially slidably but not relatively rotatably around front-wheel driving shaft 83. A rear end of the inner periphery of clutch sleeve 82 is toothed so as to engage with a splined hub 81 fixed around clutch shaft 78. In clutch sleeve 82, front-wheel driving shaft 83 is penetrated by a diametrical bore, in which a compressed spring 84 is disposed. Each of detent balls 85 is interposed between each end of spring 84 and the inner periphery of clutch sleeve 82. Spring 84 biases detent balls 85 against clutch sleeve 82. Clutch sleeve 82 is allowed to slide along front-wheel driving shaft 83 so that clutch sleeve 82, while sliding, pushes detent balls 85 into the diametrical bore of shaft 83 against spring 84. Each detent ball 85 is provided with a pair of front and rear detent holes 82a and 82b, as shown in FIG. 6, formed in the inner peripheral surface of clutch sleeve 82 so as to fix front-wheel driving shaft 83 to clutch sleeve 82. When detent balls 85 are fitted into the respective front detent holes 82a the rear toothed end of clutch sleeve 82 meshes with splined hub 81, thereby fixing shaft 80 to shaft 83 so as to establish a four-wheel driving mode. When detent balls 85 are fitted into the respective rear detent holes 82b, the rear toothed end of clutch sleeve 82 is separated from splined hub 81, thereby separating shaft 80 from shaft 83 so as to establish a two-wheel driving mode.

As shown in FIG. 2, for sliding clutch sleeve 82, a fork shaft 86 is rotatably supported by upper divisional member 2a of housing 2 and disposed above shafts 80 and 83 perpendicularly to shafts 80 and 83 in housing 2. A fork 87 is interposed between fork shaft 86 and clutch sleeve 82 so that clutch sleeve 82 slides by rotation of fork shaft 86. As shown in FIG. 6, a clutch control lever 88 is fixed on fork shaft 86 outside housing 2 so as to interlock with a manipulated device (e.g., a lever or a pedal) provided on the vehicle for switching the driving mode of the vehicle.

Figure 7:
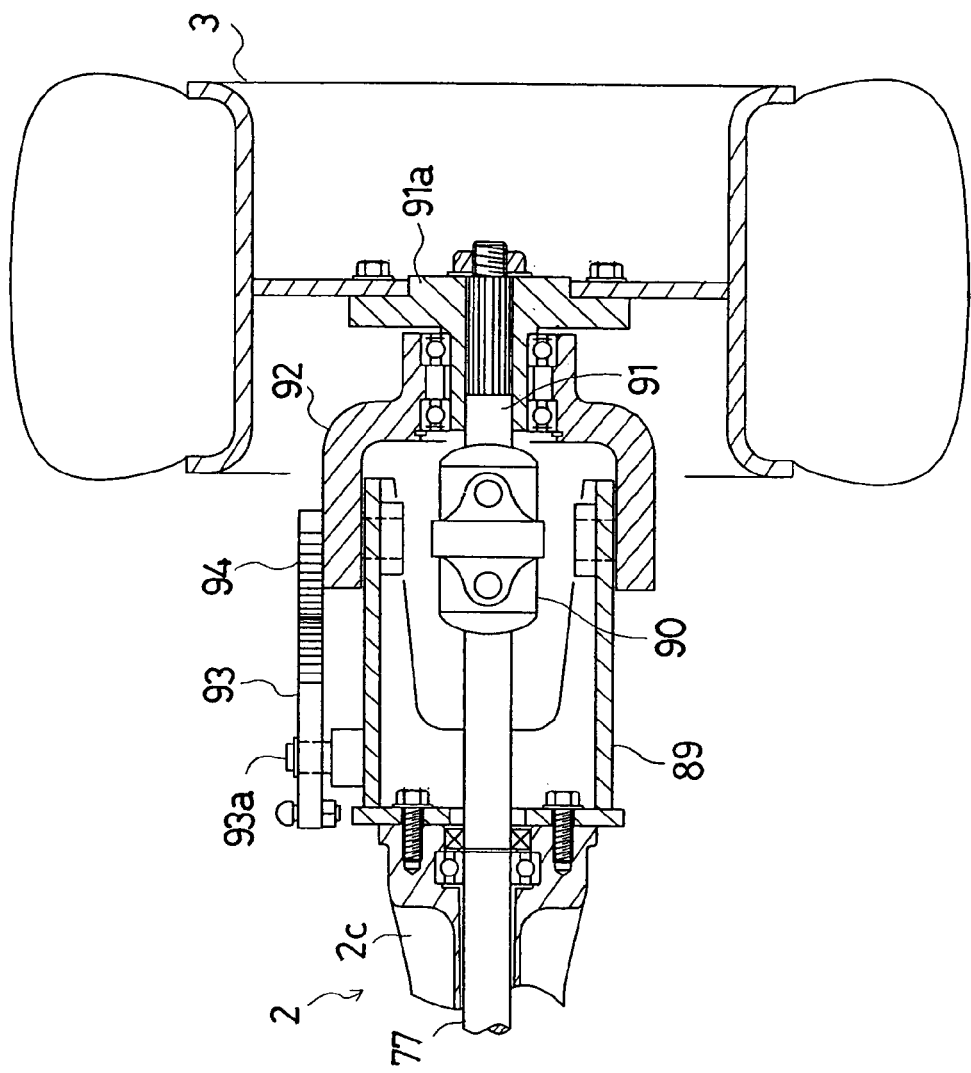
FIG. 7 is a sectional rear view of a mechanism between an end portion of the rear transaxle housing shown in FIG. 2 and a rear wheel.

Portions of lower divisional member 2c of rear transaxle housing 2 rotatably supporting respective rear axles 77 therein (shown in FIG. 3) are extended along rear axles 77 so as to be fixed to respective axle end casings 89, as shown in FIG. 7. A rear wheel shaft 91 is fixed to each rear wheel 3 through a shaft casing 91a so as to serve as an axial core of rear wheel 3. Each rear axle 77 projects outward from lower divisional member 2c of rear transaxle housing 2 into axle end casing 89 so as to be connected to each rear wheel shaft 91 through a universal joint 90. A knuckle arm 92 is relatively rotatably disposed around each rear wheel shaft 91 so as to be connected to axle end casing 89 laterally rotatably in relation to axle end casing 89. Thus, rear wheels 3 are driven together with rear axles 77 by the output force of HST 18 while rear wheels 3 are allowed to laterally rotate relatively to rear transaxle housing 2.

Figure 8:
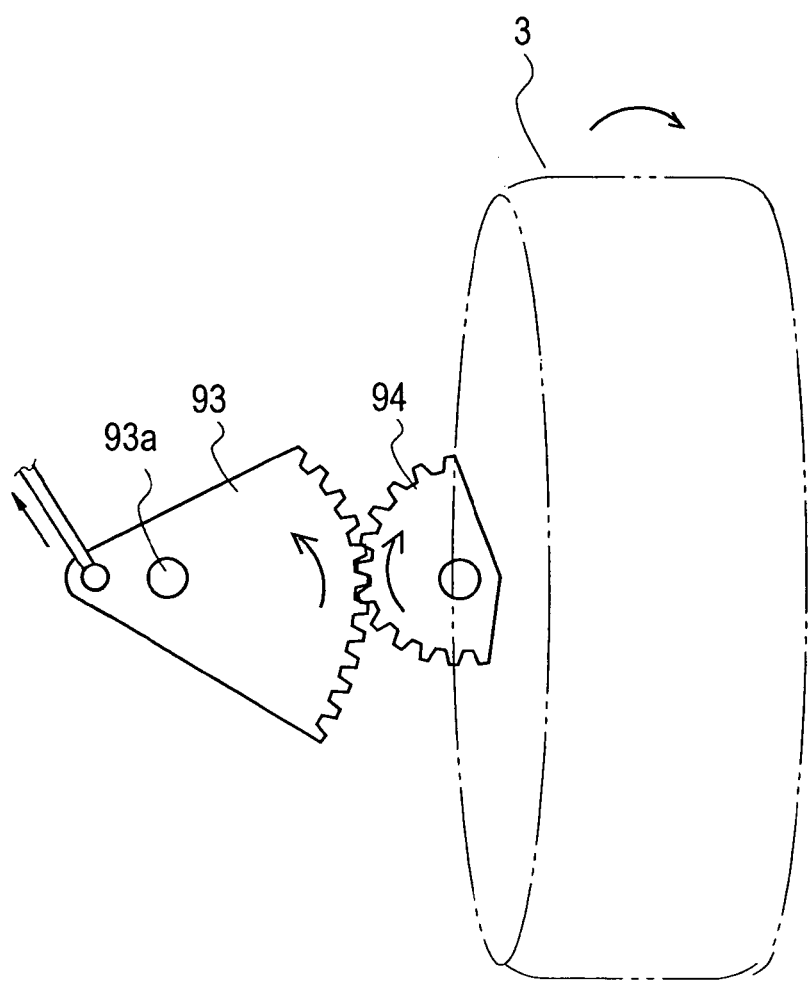
FIG. 8 is a fragmentary plan view of a steering gear mechanism attached to one of the rear wheels.
Figure 12:
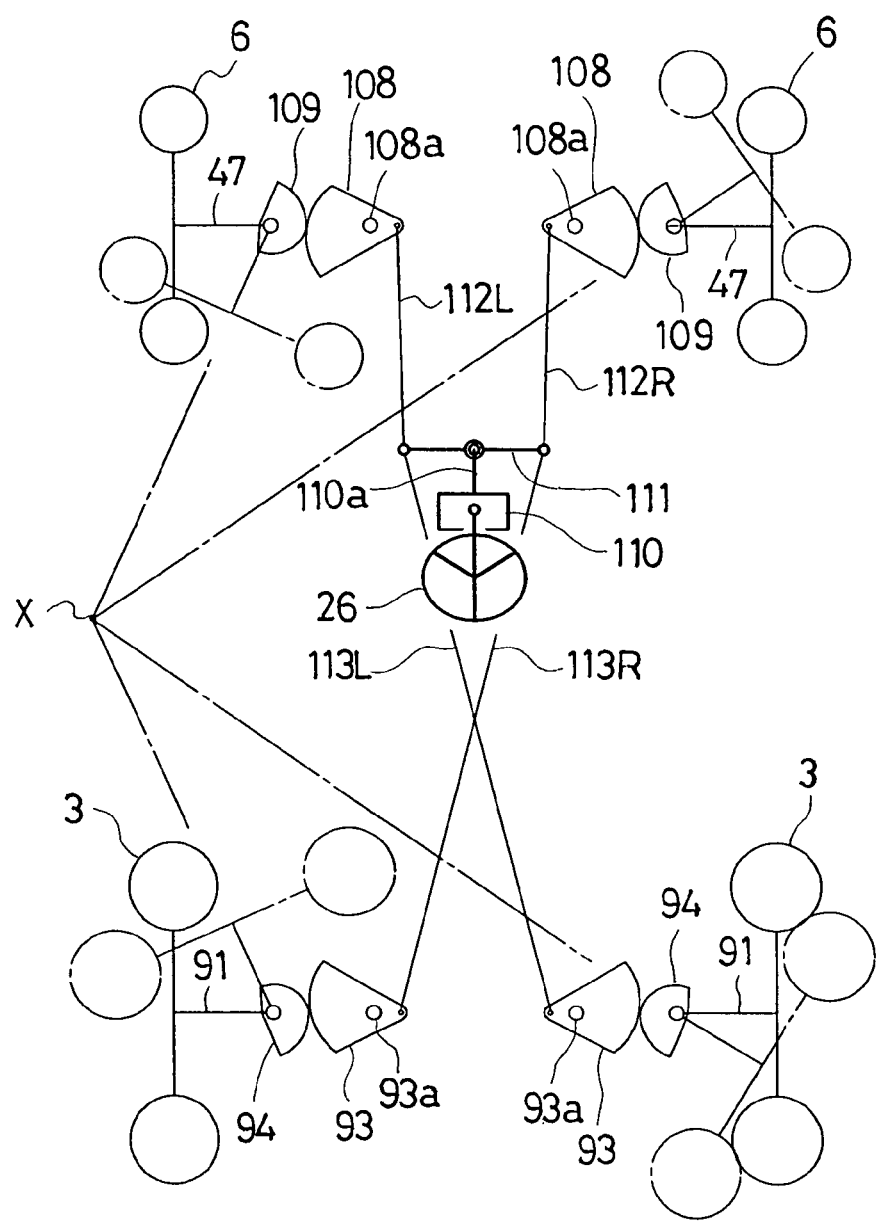
FIG. 12 is a diagram of a steering link system of a vehicle according to the present invention.

For laterally rotating each rear wheel 3, as shown in FIGS. 7, 8 and 12, a large sector gear 93 is laterally rotatably fitted to the top of axle end casing 89 through a vertical pivot 93a, and a small sector gear 94 meshing with large sector gear 93 is disposed above knuckle arm 92 so as to be laterally rotated together with knuckle arm 92 according to rotation of large sector gear 93. A steering system of the vehicle is detailed later.

Figure 9:
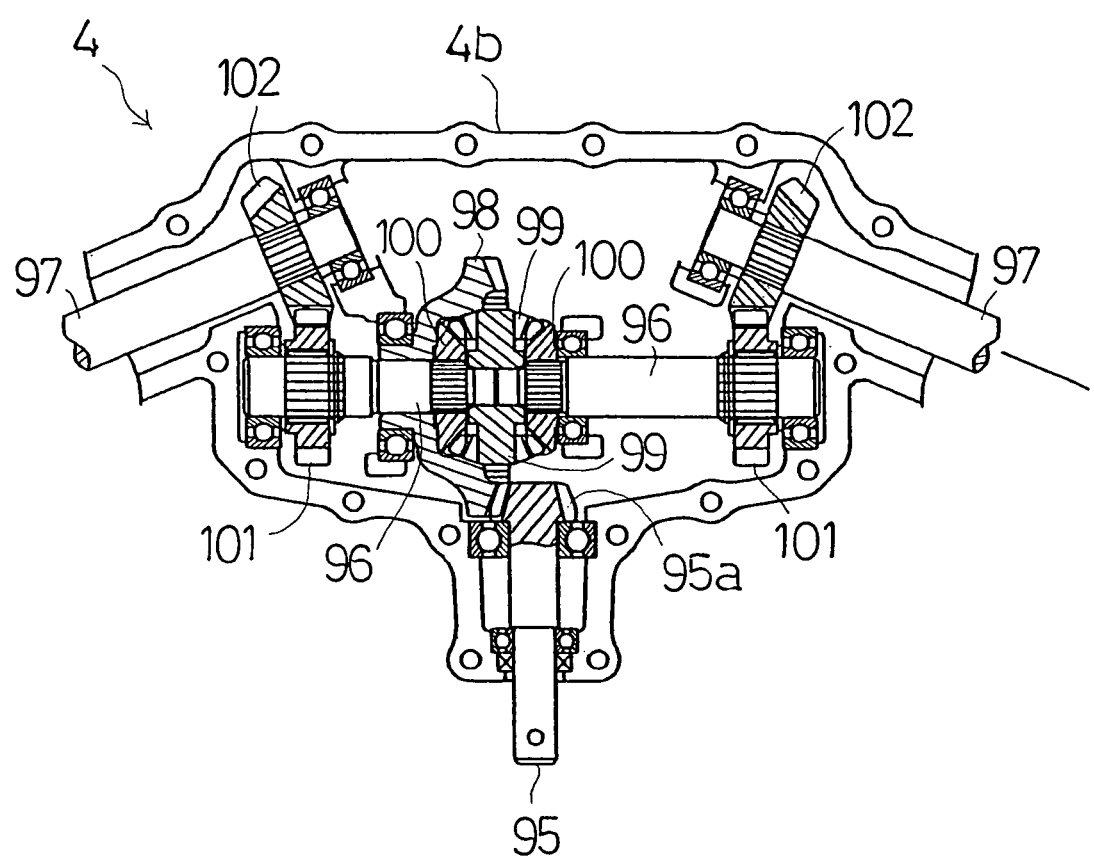
FIG. 9 is a plan view partly in section of a principal interior portion of a front transaxle housing according to the present invention from which an upper divisional member is removed.
Figure 10:
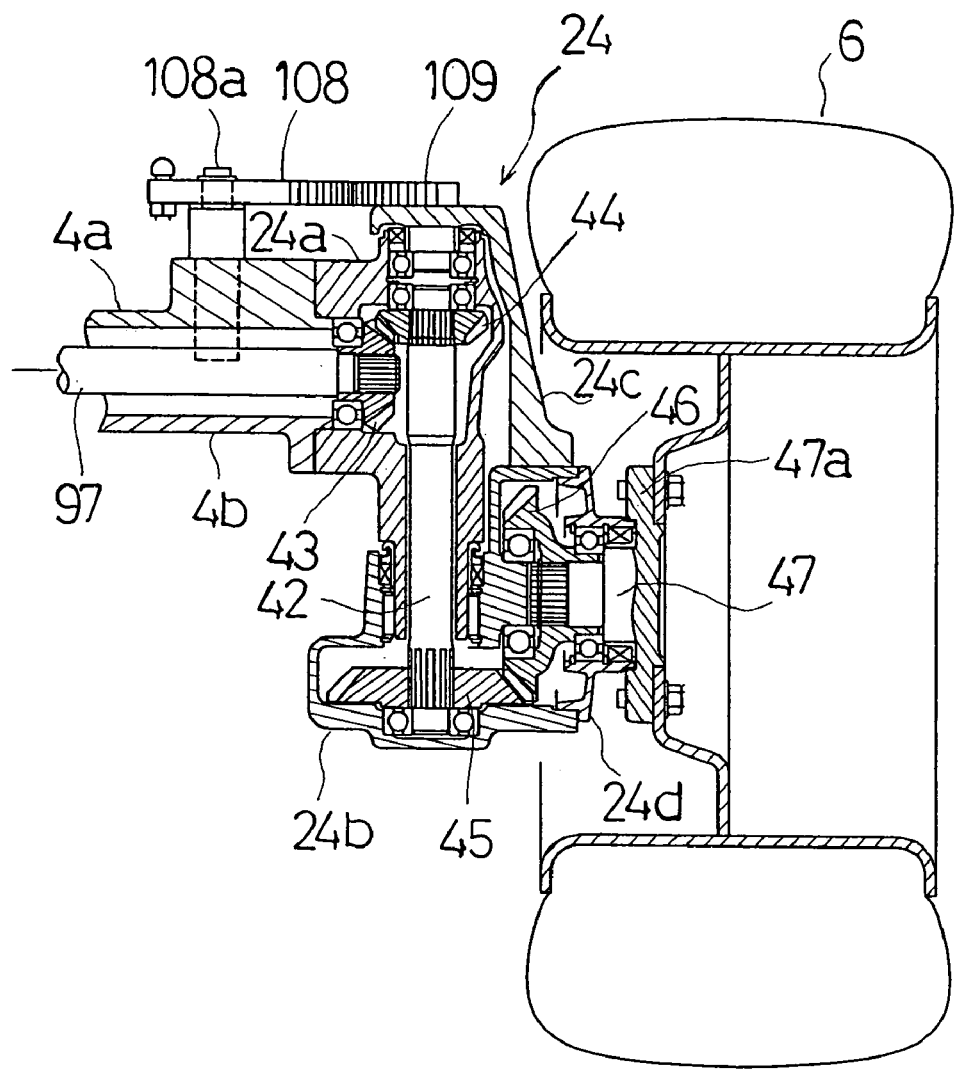
FIG. 10 is a sectional rear view of a mechanism between an end portion of the front transaxle housing shown in FIG. 9 and a front wheel.
Figure 11:
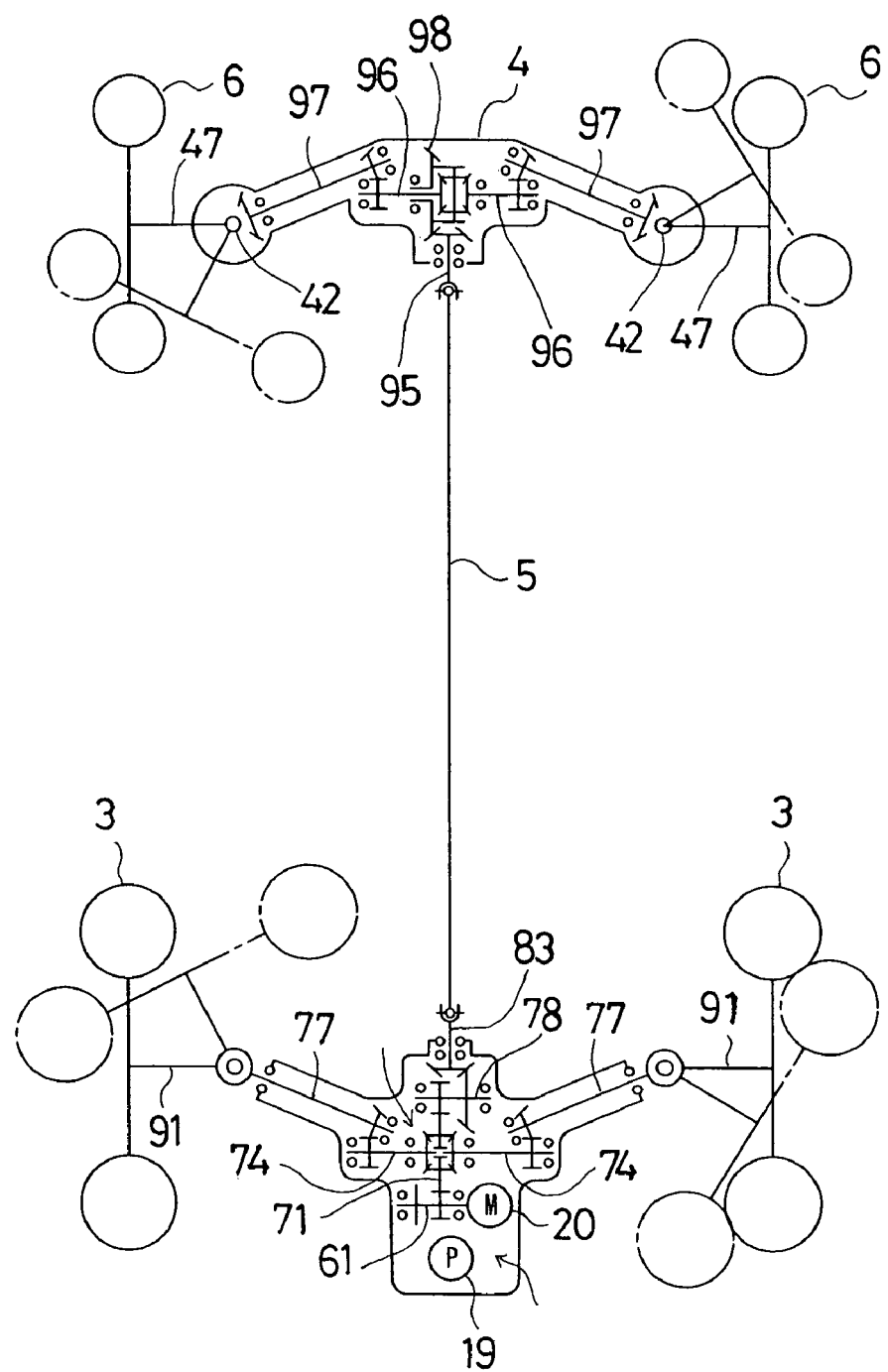
FIG. 11 is a diagram of a driving power transmission system of a vehicle according to the present invention wherein a single propeller shaft is interposed between a rear transaxle housing and a front transaxle housing as shown in FIGS. 2 to 10.

Referring to FIGS. 9, 10 and 11, an interior structure of front transaxle housing 4 will be described. Front transaxle housing 4 consists of upper and lower divisional members 4a and 4b joined to each other through a horizontal joint surface. An input shaft 95, a pair of differential output shafts 96 and a pair of front axles 97 are rotatably sandwiched between upper and lower divisional members 4a and 4b through bearings. That is, axes of all shafts 95 and 96 and axles 97 are substantially disposed on the horizontal joint surface between upper and lower divisional members 4a and 4b.

Input shaft 95 is disposed longitudinally along the vehicle and projects backward from front transaxle housing 4 so as to be connected to propeller shaft 5 through a universal joint. In front transaxle housing 4, a front end of input shaft 95 is formed into a bevel gear 95a.

The pair of differential output shafts 96 are disposed coaxially to each other and proximal ends of both shafts 96 almost abut against each other while being allowed to rotate relatively to each other. Each differential output shaft 96 is fixedly provided thereon with a differential side gear 100. A differential input gear 98 is rotatably provided on one of differential output shafts 96. An outer periphery of differential input gear 98 is formed into a bevel gear meshing with bevel gear 95a. A pair of differential pinions 99 are rotatably retained in differential input gear 98. One differential side gear 100 is freely rotatably disposed in differential input gear 98 while the other differential side gear 100 is outside differential input gear 98.

Front axles 97 are disposed laterally and backwardly slantwise. A spur gear 101 is fixed on each differential output shaft 96 adjacently to a distal end of shaft 96. A bevel gear 102 is fixed on each front axle 97 adjacently to a proximal end of axle 97 so as to mesh with gear 101. Thus, power received by input shaft 95 is transmitted to both front axles 97.

As shown in FIG. 10, portions of front transaxle housing 4 rotatably supporting respective front axles 97 therein are extended along front axles 97 and joined to respective final deceleration gear casings 24. Each final deceleration gear casing 24 consists of a vertical member 24a, a base member 24b, an upper member 24c and an axial member 24d. An upper portion of vertical member 24a is fixed to the distal end of the portion of front transaxle housing 4 enclosing front axle 97 and extended downward. Base member 24b, upper member 24c and axial member 24d are fixed together, laterally rotatably fitted relative to vertical member 24a, and rotatably fitted relative to front wheel 6. A top of upper member 24c is relatively rotatably fitted onto a top of vertical member 24a. A bottom of vertical member 24a is inserted downward into base member 24b and relatively rotatably fitted to base member 24b. Therefore, integral base, upper and axial members 24b, 24c and 24d are laterally rotatable relative to front transaxle housing 4.

A distal end of each front axle 97 projects from the distal end of front transaxle housing 4 and is inserted into vertical member 24a. A vertical deceleration shaft 42 is disposed in vertical member 24a. A top of deceleration shaft 42 is rotatably supported by the top portion of vertical member 24a through bearings. In vertical member 24a, a bevel gear 43 fixed on the distal end of front axle 97 meshes with a bevel gear 44 fixed on deceleration shaft 42. A bottom portion of deceleration shaft 42 projects downward from vertical member 24a and inserted into base member 24b. The bottom end of deceleration shaft 42 is rotatably supported by a bottom of base member 24b through a bearing. In base member 24b, a bevel gear 45, which is diametrically larger than bevel gear 44, is fixed on the bottom portion of deceleration shaft 42.

A front wheel shaft 47 is substantially horizontally disposed axially of each front wheel 6. A bevel gear 46 is fixed on front wheel shaft 47 in base member 24b and axial member 24d and meshes with bevel gear 45. Bevel gear 46 is rotatably fitted to base member 24b and axial member 24d through respective bearings. A base end of front wheel shaft 47 is disposed outside final reduction gear casing 24 and formed into a flange 47a fixed to front wheel 6. Therefore, the rotation of each front axle 97 is transmitted to corresponding front wheel 6.

A large sector gear 108 is laterally rotatably fitted through a vertical pivot 108a on the top of the distal end portion of front transaxle housing 4. A small sector gear 109, which is radially smaller than large sector gear 108, is fixed onto the top of upper member 24c through a vertical shaft disposed coaxially to vertical deceleration shaft 42. Small sector gear 109 meshes with large sector gear 108 so as to be laterally rotated together with corresponding front wheel 6 relative to front transaxle housing 4 according to rotation of large sector gear 108.

The steering system of the vehicle will be described mainly in accordance with FIG. 12. A stem extended downward from steering wheel 26 is fitted into a steering gear box 110. An output shaft 110a of steering gear box 110 is connected to a middle portion of a tie rod 111. A link rod 112R is extended forward from a right end of tie rod 111 and pivotally connected to a proximal end of right large sector gear 108 opposite to the toothed edge thereof with respect to vertical pivot 108a. A link rod 112L is extended forward from a left end of tie rod 111 and pivotally connected to a proximal end of left large sector gear 108 opposite to the toothed edge thereof with respect to vertical pivot 108a. A link rod 113R is extended backward from the right end of tie rod 111 and pivotally connected to a proximal end of left large sector gear 93 opposite to the toothed edge thereof with respect to vertical pivot 93a. A link rod 113L is extended backward from the left end of tie rod 111 and pivotally connected to a proximal end of right large sector gear 93 opposite to the toothed edge thereof with respect to vertical pivot 93a. That is, link rods 113R and 113L cross each other.

In FIG. 12, wheels 3 and 6 in straight traveling are drawn in solid lines, and those when the vehicle turns left are in phantom lines. When steering wheel 26 is turned left, tie rod 111 is tilted so as to pull link rod 112L backward and push link rod 112R forward, thereby revolving front wheels 6 leftward. Simultaneously, link rod 113R is pulled forward and link rod 113L is pushed backward, thereby revolving rear wheels 3 rightward. Namely, when steering wheel 26 is rotated to either right or left side from the neutral position (the position for straight traveling of the vehicle), front wheels 6 are laterally turned to the same lateral side corresponding to the rotational direction of steering wheel 26, and rear wheels 3 is turned laterally in opposite to the rotational direction of steering wheel 26.

Small sector gears 94 and 109 amplify respective large sector gears 93 and 108 in their rotational angles.

Furthermore, the gear ratio of each set of mutually meshing large and small sector gears 108 and 109, i.e., the radius ratio of gear 109 to gear 108 increases as gears 108 and 109 rotate backward, i.e., corresponding link rod 112R or 112L is pulled backward. If corresponding front wheel 6 is disposed at the lateral inside of the turning vehicle (hereinafter, this front wheel 6 is referred to as an inside front wheel 6), the gear ratio becomes smaller than that when the vehicle travels straight (i.e., when steering wheel 26 is located at its neutral position). If corresponding front wheel 6 is disposed at the lateral outside of the turning vehicle (hereinafter, this front wheel 6 is referred to as an outside front wheel 6), the gear ratio becomes larger than that when the vehicle travels straight. Therefore, during rotational operation of steering wheel 26 for turning the vehicle right or left, the lateral turning angle of inside front wheel 6 becomes larger than that of outside front wheel 6 so that extensions of axes of front wheels 6 cross each other at a point at a lateral inside of the vehicle in turning.

The gear ratio of each set of mutually meshing large and small sector gears 93 and 94, i.e., the radius ratio of gear 94 to gear 93 increases as gears 93 and 94 rotate forward, i.e., corresponding link rod 113R or 113L is pulled forward. If corresponding rear wheel 3 is disposed at the lateral inside of the turning vehicle (hereinafter, this rear wheel 3 is referred to as an inside rear wheel 3), the gear ratio becomes smaller than that when the vehicle travels straight. If corresponding rear wheel 3 is disposed at the lateral outside of the turning vehicle (hereinafter, this rear wheel 3 is referred to as an outside rear wheel 3), the gear ratio becomes larger than that when the vehicle travels straight. Therefore, during rotational operation of steering wheel 26 for turning the vehicle right or left, the lateral turning angle of inside rear wheel 3 becomes larger than that of outside rear wheel 3 so that extensions of axes of rear wheels 3 cross each other at a point at a lateral inside of the vehicle in turning.

The vehicle is so designed that the crossing point of axial extensions of front wheels 6 coincides with that of axial extensions of rear wheels 3. The crossing point X shared among axial extensions of all front and rear wheels 6 and 3 approaches the lateral middle portion of the vehicle as steering wheel 26 is rotated from the neutral position.

As a result, the vehicle can turn in small circles while remaining nicely balanced.

Figure 13:
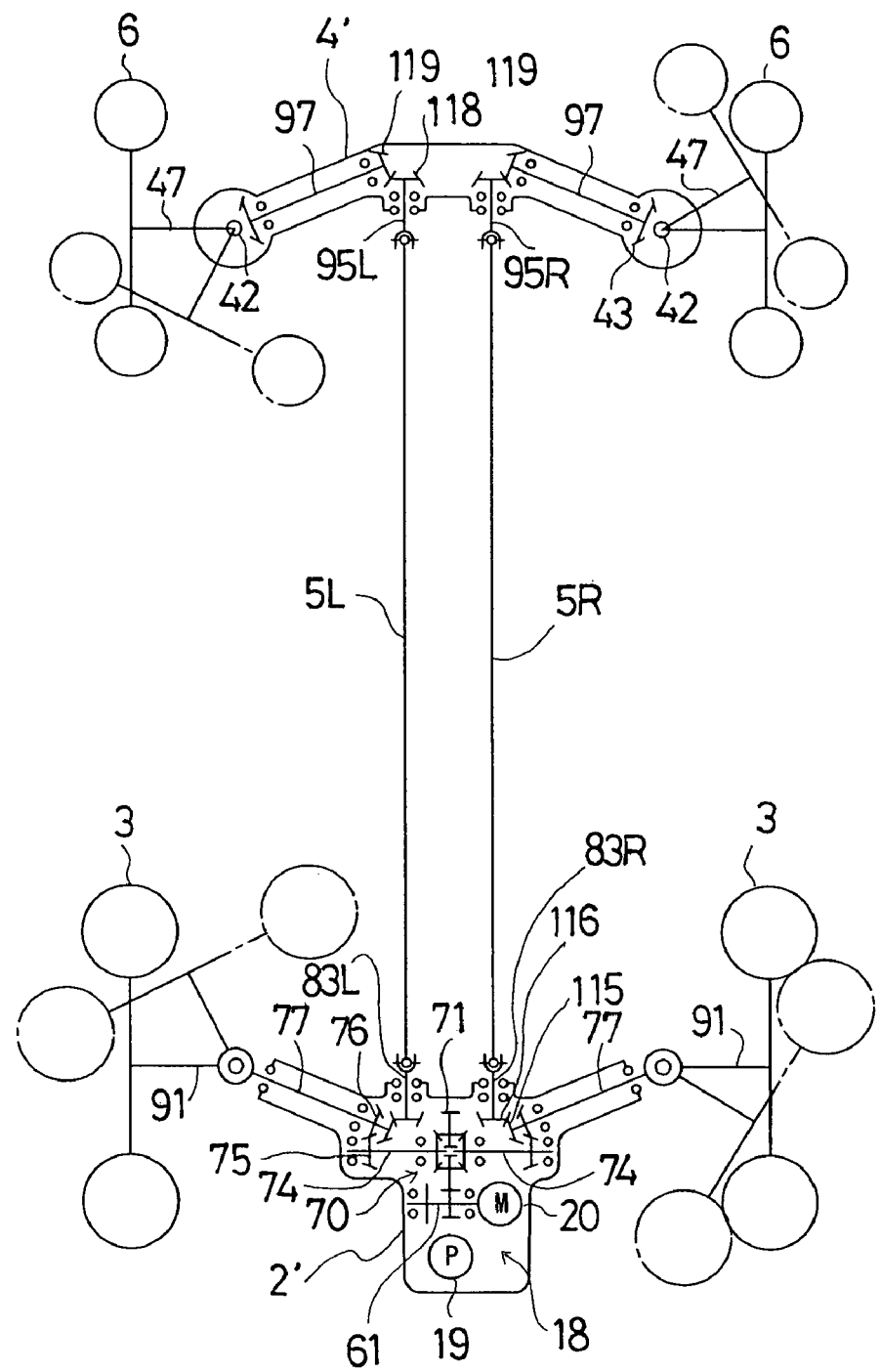
FIG. 13 is a diagram of another driving power transmission system of a vehicle according to the present invention using a pair of propeller shafts interposed between a rear transaxle housing and a front transaxle housing.

Alternative embodiments of rear and front transaxle housings 2 and 4 and the power transmission system therebetween will be described in accordance with FIG. 13. A rear transaxle housing 2' serving as modified rear transaxle housing 2 is provided with a pair of right and left front-wheel driving shafts 83R and 83L projecting forward therefrom. In rear transaxle housing 2', right and left front-wheel driving shafts 83R and 83L are fixedly provided thereon with respective bevel gears 116. In rear transaxle housing 2', a bevel gear 115 is fixed on each of rear axles 77 and meshes with each bevel gear 116. That is, right and left front-wheel driving shafts 83R and 83L are not driven by differential input gear 71 but by respective rear axles 77.

Front transaxle housing 4' incorporates no differential gear unit between right and left front axles 97. Front transaxle housing 4' is provided with a pair of right and left input shafts 95R and 95L projecting backward therefrom. In front transaxle housing 4', right and left input shafts 95R and 95L are fixedly provided thereon with respective bevel gears 118. In front transaxle housing 4, a bevel gear 119 is fixed on each of front axles 97 and meshes with each bevel gear 118. That is, right and left input shafts 95R and 95L drive respective front axles 97.

Right propeller shaft 5R is interposed between night front-wheel driving shaft 83R and right input shaft 95R through universal joints, and left propeller shaft 5L between left front-wheel driving shaft 83L and left input shaft 95L through universal joints. Therefore, while right and left rear wheels 3 are differentially connected to each other, right front wheel 6 is driven synchronously with right rear wheel 3, and left front wheel 6 with left rear wheel 3.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A vehicle, comprising:
   a prime mover;
   a pair of right and left steerable first wheels;
   a pair of right and left steerable second wheels;
   a common steering operation device interlocking with each of said pair of first and second wheels so as to steer all of said first and second wheels;
   a first transaxle apparatus disposed at one of front and rear portions of said vehicle;
   a pair of right and left first axles supported by said first transaxle apparatus wherein said right and left first wheels are attached to the outermost ends of said respective first axles so as to be turned laterally according to manipulation of said steering operation device;
   a first differential gear unit of said first transaxle apparatus for differentially connecting said first axles to each other;
   a power take-off shaft supported by said first transaxle apparatus;
   a transmission of said first transaxle apparatus driven by said prime mover, output force of said transmission being shared between said first differential gear unit and said power take-off shaft;
   a second transaxle apparatus disposed at the other of said front and rear portions of said vehicle;
   a pair of right and left second axles supported by said second transaxle apparatus wherein said right and left second wheels are attached to the outermost ends of said respective second axles so as to be turned laterally according to manipulation of said steering operation device;
   a second differential gear unit of said second transaxle apparatus for differentially connecting said second axles to each other;
   an input shaft of said second differential gear unit supported by said second transaxle apparatus; and
   a power-transmitting member interposed between said power take-off shaft and said input shaft so as to transmit the output force of said transmission to said second wheels.

2. The vehicle as set forth in claim 1, wherein said first transaxle apparatus includes a housing incorporating said transmission.

3. The vehicle as set forth in claim 1, wherein said transmission is a hydrostatic transmission.

4. The vehicle as set forth in claim 1, wherein said steering operation device is provided with a neutral position for straight traveling of said vehicle and that can be manipulated from said neutral position to laterally opposite positions with respect to said vehicle, and wherein, when said steering operation device is manipulated from said neutral position to one of the laterally opposite positions, either said pair of first wheels or said pair of second wheels are turned laterally in the same direction of the lateral position of said manipulated steering operation device, and the other pair of first wheels or second wheels are turned laterally in the opposite direction to that of the lateral position of said manipulated steering operation device.

5. The vehicle as set forth in claim 4, wherein when said steering operation device is manipulated from said neutral position extensions of axes of all of said first and second wheels are gathered together at a point.

6. The vehicle as set forth in claim 5, wherein said point approaches the lateral middle of said vehicle as said steering operation device is manipulated from said neutral position.

7. The vehicle as set forth in claim 4, wherein a lateral turning angle of one of said right and left first wheels disposed at the lateral inside of said vehicle turning right or left is larger than a lateral turning angle of the other left or right first wheel disposed at the lateral outside of said turning vehicle, and wherein a lateral turning angle of one of said right and left second wheels disposed at the lateral inside of said vehicle turning right or left is larger than a lateral turning angle of the other left or right second wheel disposed at the lateral outside of said turning vehicle.

* * * * *